United States Patent
Higuchi et al.

(10) Patent No.: US 6,267,694 B1
(45) Date of Patent: *Jul. 31, 2001

(54) MULTI-PIECE SOLID GOLF BALL

(75) Inventors: Hiroshi Higuchi; Yasushi Ichikawa; Hisashi Yamagishi; Junji Hayashi; Akira Kawata, all of Chichibu (JP)

(73) Assignee: Bridgestone Sports Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/131,772

(22) Filed: Aug. 10, 1998

Related U.S. Application Data
(60) Provisional application No. 60/058,564, filed on Sep. 11, 1997.

(30) Foreign Application Priority Data

Aug. 8, 1997 (JP) .................................................. 9-227609
Oct. 22, 1997 (JP) .................................................. 9-307971

(51) Int. Cl.$^7$ .................................................. A63B 37/06
(52) U.S. Cl. .................................................. 473/374; 473/373
(58) Field of Search .................................. 473/373, 378, 473/351, 374, 377

(56) References Cited

U.S. PATENT DOCUMENTS

| | | |
|---|---|---|
| 4,919,434 * | 4/1990 | Saito ..................................... 473/373 |
| 5,026,067 | 6/1991 | Gentiluomo . |
| 5,253,871 | 10/1993 | Viollaz . |
| 5,553,852 * | 9/1996 | Higuchi et al. ................... 473/378 X |
| 5,730,664 * | 3/1998 | Asakura et al. ....................... 473/373 |
| 5,813,923 * | 9/1998 | Cavallaro et al. ............... 473/378 X |
| 5,929,189 * | 7/1999 | Ichikawa et al. ................ 473/378 X |

FOREIGN PATENT DOCUMENTS

| | | |
|---|---|---|
| 0 633 043 A1 | 1/1995 | (EP) . |
| 2 278 609 | 12/1994 | (GB) . |
| WO 97/18861 | 5/1997 | (WO) . |

* cited by examiner

Primary Examiner—Mark S. Graham
Assistant Examiner—Raeann Gordon
(74) Attorney, Agent, or Firm—Sughrue, Mion, Zinn, Macpeak & Seas, PLLC

(57) ABSTRACT

A multi-piece solid golf ball featuring an increased flight distance, superior control, good feeling, and improved durability is provided. A multi-piece solid golf ball comprising a solid core and a cover of two inner and outer layers surrounding the core is characterized in that the solid core has a distortion of at least 2.4 mm under an applied load of 100 kg, the inner cover layer is formed mainly of an ionomer resin to a Shore D hardness of 28–58, and the outer cover layer is formed mainly of a thermoplastic polyurethane elastomer to a Shore D hardness of 30–55.

17 Claims, 1 Drawing Sheet

MULTI-PIECE SOLID GOLF BALL

CROSS REFERENCE TO RELATED APPLICATION

This application is an application filed under 35 U.S.C.§111(a) claiming benefit pursuant to 35 U.S.C. § 119(e)(i) of the filing date of the Provincial Application 60/058,564 filed on September 11, 1997 pursuant to 35 U.S.C. §111(b).

BACKGROUND OF THE INVENTION

1. Field of the Invention

This invention relates to a multi-piece solid golf ball comprising a solid core enclosed with a cover of two inner and outer layers.

2. Prior Art

Golf balls of various structures have recently been proposed. In particular, many proposals were made on solid golf balls, inter alia, multi-piece solid golf balls comprising a solid core enclosed with a cover of plural layers from the standpoints of flight distance, control (or spin rate), and feeling (see JP-A 244174/1992, 142228/1994, 24084/1995, 24085/1995, and 10358/1997).

Nevertheless, there is a desire to have a multi-piece solid golf ball having further improved flight performance, superior spin property, and good feeling upon wood, iron and putter shots as well as good scraping resistance and durability.

SUMMARY OF THE INVENTION

Making extensive investigations to meet the above desire, the inventors have found that it is effective for a multi-piece solid golf ball comprising a solid core and a cover of two layers, an inner and outer layer surrounding the core that the solid core is formed relatively soft, the inner cover layer is formed mainly of an ionomer resin, the outer cover layer is formed mainly of a thermoplastic polyurethane elastomer, the inner cover layer has a Shore D hardness of 28 to 58, and the outer cover layer has a Shore D hardness of 30 to 55.

Specifically, the present invention provides:

(1) A multi-piece solid golf ball comprising a solid core and a cover of two inner and outer layers surrounding the core, characterized in that said solid core has a distortion of at least 2.4 mm under an applied load of 100 kg, said inner cover layer is formed mainly of an ionomer resin to a Shore D hardness of 28 to 58, and said outer cover layer is formed mainly of a thermoplastic polyurethane elastomer to a Shore D hardness of 30 to 55.

(2) The golf ball of (1) wherein the resin of said inner cover layer is a mixture of an ionomer resin and an olefinic elastomer in a weight ratio between 40:60 and 95:5.

(3) The golf ball of (1) or (2) wherein in said outer cover layer, an ionomer resin having a Shore D hardness of at least 55 is mixed in a proportion of less than 70 parts by weight per 100 parts by weight of the thermoplastic polyurethane elastomer.

(4) The golf ball of any one of (1) to (3) wherein the ball as a whole has an inertia moment of at least 83 g-cm$^2$.

(5) The golf ball of any one of (1) to (4) wherein 1 to 30% by weight of an inorganic filler is added to said outer cover layer.

(6) The golf ball of any one of (1) to (5) wherein 1 to 30% by weight of an inorganic filler is added to said inner cover layer.

(7) The golf ball of any one of (1) to (6) wherein said outer cover layer has a specific gravity of 1.05 to 1.4.

(8) The golf ball of any one of (1) to (7) wherein said inner cover layer has a specific gravity of 0.8 to 1.2.

(9) The golf ball of any one of (1) to (8) wherein said core has a specific gravity of 0.9 to 1.3.

(10) The golf ball of any one of (1) to (9) wherein said outer cover layer has a gage of 0.5 to 2.5 mm, said inner cover layer has a gage of 0.5 to 3.0 mm, and said cover has a total gage of 1.0 to 5.5 mm.

The golf ball of the invention features an increased flight distance, superior control upon iron shots, good feeling upon shots with any club of wood, iron and putter, high resistance to scraping upon control shots with an iron, and good durability.

DETAILED DESCRIPTION OF THE INVENTION

Figure 1:
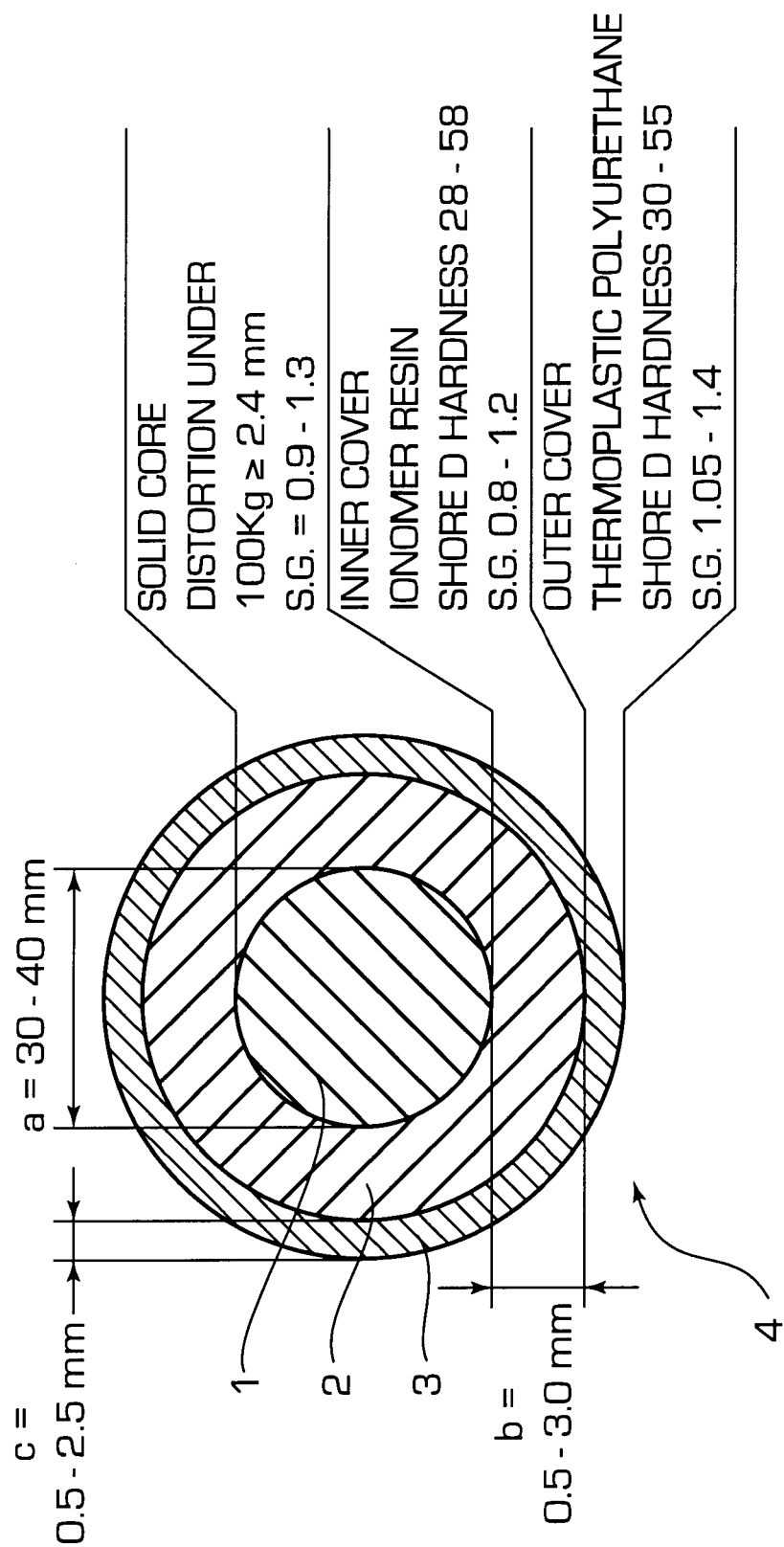
FIG. 1 is a schematic cross-section of the multi-piece golf ball according to this invention.

Now the invention is described in more detail.

The multi-piece solid golf ball of the invention has a solid core 1 and a cover 4 surrounding the core of a two-layer structure of inner and outer cover layers 2 and 3.

The solid core 1 used herein is formed mainly of a rubber base. Natural rubber and/or synthetic rubber which is used in conventional solid golf balls can be used as the rubber base although 1,4-polybutadiene having at least 40% of a cis structure is especially preferred in the practice of the invention. Herein, natural rubber, polyisoprene rubber, styrene-butadiene rubber or the like may be blended with the polybutadiene rubber if desired.

More particularly, the solid core 1 of the golf ball according to the invention is obtained in conventional ways by adjusting vulcanizing conditions and blending ratio. In general, the solid core composition contains a base rubber, a crosslinking agent, a co-crosslinking agent, an inert filler, etc. The base rubber used may be the above-mentioned natural rubber and/or synthetic rubber. The crosslinking agent is exemplified by organic peroxides such as dicumyl peroxide and di-t-butyl peroxide, with the dicumyl peroxide being especially preferred. The amount of the crosslinking agent blended is usually 0.5 to 2.0 parts by weight per 100 parts by weight of the base rubber.

The co-crosslinking agent is not critical and exemplified by metal salts of unsaturated fatty acids, especially zinc and magnesium salts of unsaturated fatty acids having 3 to 8 carbon atoms (e.g., acrylic acid and methacrylic acid), with zinc acrylate being especially preferred. The amount of the co-crosslinking agent blended is 10 to 50 parts by weight, preferably 20 to 48 parts by weight per 100 parts by weight of the base rubber.

Examples of the inert filler include zinc oxide, barium sulfate, silica, calcium carbonate, and zinc carbonate, with zinc oxide and barium sulfate being commonly used. The amount of the filler blended is governed by the specific gravity of the core and the cover, the weight specification of the ball, etc. and not critical although it is usually 3 to 30 parts by weight per 100 parts by weight of the base rubber. It is understood that in the practice of the invention, the solid core is given an optimum hardness by properly adjusting the amount of zinc oxide and barium sulfate blended.

A solid core composition is prepared by kneading the above-mentioned components in a conventional mixer such as a Banbury mixer and roll mill, and it is compression or injection molded in a core mold. The molding is then cured into a solid core by heating at a sufficient temperature for the crosslinking agent and co-crosslinking agent to function (for example, about 130 to 170° C. when dicumyl peroxide and zinc acrylate are used as the crosslinking agent and the co-crosslinking agent, respectively).

The solid core 1 should have a distortion or deformation of at least 2.4 mm, preferably 2.7 to 7.0 mm, more preferably 2.9 to 5.5 mm under an applied load of 100 kg. A distortion of less than 2.4 mm under an applied load of 100 kg (hard core) would give disadvantages such as a hard hitting feel. A too much distortion (too soft core) would sometimes fail to provide sufficient restitution.

The solid core 1 preferably has a specific gravity of 0.9 to 1.3, especially 1.0 to 1.25.

In the practice of the invention, the solid core 1 preferably has a diameter (2) of 30 to 40 mm, especially 33 to 39 mm. Also the solid core may be of multi-layer structure insofar as it satisfies the above-defined distortion under an applied load of 100 kg.

Next, the inner cover layer 2 is formed mainly of an ionomer resin. The ionomer resin may be used alone or in admixture of two or more and is selected on use so as to satisfy the Shore D hardness and specific gravity described below. For example, "Surlyn" by E. I. duPont, "Himilan" by Mitsui duPont Polychemicals K. K., and "Iotek" by Exxon may be used.

In this regard, by mixing the ionomer resin with an olefinic elastomer, properties (e.g., hitting feel and restitution) which are not available when they are used alone can be obtained. The olefinic elastomer used herein includes linear low-density polyethylene, low-density polyethylene, high-density polyethylene, polypropylene, rubber-reinforced olefin polymers, flexomers, plastomers, thermoplastic elastomers (styrene block copolymers and hydrogenated polybutadiene-ethylene-propylene rubber) including acid-modified products, dynamically vulcanized elastomers, ethylene acrylate, and ethylene-vinyl acetate. For example, "HPR" by Mitsui duPont Polychemicals K.K. and "Dynalon" by Nippon Synthetic Rubber K.K. are used.

The mixing proportion of the ionomer resin to the olefinic elastomer is desirably between 40:60 and 95:5, preferably between 45:55 and 90:10, more preferably between 48:52 and 88:12, especially between 55:45 and 85:15 in weight ratio. Too less contents of the olefinic elastomer would lead to hard hitting feel. On the other hand, too large contents of the olefinic elastomer would detract from resiliency.

Understandably, another polymer may be blended with the ionomer resin insofar as the benefits of the invention are not impaired.

Further the inner cover layer 2 composed mainly of the ionomer resin may contain about 30% by weight or less of an inorganic filler such as zinc oxide, barium sulfate, and titanium dioxide. Preferably the amount of the filler is 1 to 30% by weight.

The inner cover layer 2 should have a Shore D hardness of 28 to 58, especially 30 to 57. A Shore D hardness of less than 28 would detract from restitution whereas hitting feel would be exacerbated above 58.

Further, the inner cover layer 2 should preferably have a specific gravity of 0.8 to 1.2, especially 0.9 to 1.18.

It is noted that the inner cover layer preferably has a gage (6) of 0.5 to 3.0 mm, especially 0.9 to 2.5 mm.

On the other hand, the outer cover layer 3 is formed of a thermoplastic polyurethane elastomer.

The thermoplastic polyurethane elastomer used herein has a molecular structure consisting of a high molecular weight polyol compound constituting a soft segment, a monomolecular chain extender constituting a hard segment, and a diisocyanate.

The high molecular weight polyol compound is not critical and may be any of polyester polyols, polyether polyols, copolyester polyols, and polycarbonate polyols. Exemplary polyester polyols include polycaprolactone glycol, poly (ethylene-1,4-adipate) glycol, and poly(butylene-1,4-adipate) glycol; an exemplary copolyester polyol is poly (diethylene glycol adipate) glycol; an exemplary polycarbonate polyol is (hexanediol-1,6-carbonate) glycol; and an exemplary polyether polyol is polyoxytetramethylene glycol. Their number average molecular weight is about 600 to 5,000, preferably 1,000 to 3,000.

As the diisocyanate, aliphatic diisocyanates are preferably used in consideration of the yellowing resistance of the cover. Examples include hexamethylene diisocyanate (HDI), 2,2,4- or 2,4,4-trimethylhexamethylene diisocyanate (TMDI), and lysine diisocyanate (LDI). HDI is especially preferred for its compatibility with another resin upon blending.

The monomolecular chain extender is not critical and may be selected from conventional polyhydric alcohols and amines. Examples include 1,4-butylene glycol, 1,2-ethylene glycol, 1,3-propylene glycol, 1,6-hexylene glycol, 1,3-butylene glycol, dicyclohexylmethylmethanediamine (hydrogenated MDA), and isophoronediamine (IPDA).

Of the thermoplastic polyurethane elastomers, those having a tan$\delta$ peak temperature of lower than −15° C., especially −16° C. to −50° C. as determined by viscoelasticity measurement are preferred in view of softness and resiliency.

As the thermoplastic polyurethane elastomer, there may be used commercially available ones whose diisocyanate component is aliphatic, for example, Pandex T7298 (−20° C.), T7295 (−26° C.), and T7890 (−30° C.) (by Dai-Nihon Ink Chemical Industry K.K.). Note that the numerals in parentheses each represent a tan$\delta$ peak temperature.

To the thermoplastic polyurethane elastomer, if necessary, an ionomer resin having a Shore D hardness of at least 55, preferably 55 to 70, more preferably 56 to 69 can be added in an amount of 0 to 70 parts by weight, especially 0 to 35 parts by weight per 100 parts by weight of the thermoplastic polyurethane elastomer. Resiliency can be improved by blending the ionomer resin. When the ionomer resin is blended, its lower limit is 1 part by weight.

Further the outer cover layer 3 composed mainly of the thermoplastic polyurethane elastomer may contain 1 to 30% by weight, especially 1.5 to 28% by weight of an inorganic filler such as zinc oxide, barium sulfate, and titanium dioxide.

The outer cover layer 3 should have a Shore D hardness of 30 to 55, preferably 32 to 54, more preferably 33 to 53. A Shore D hardness of less than 30 would lead to low restitution whereas hitting feel would be exacerbated above 55.

The outer cover layer 3 should preferably have a specific gravity of 1.05 to 1.4, especially 1.1 to 1.35.

The outer cover layer preferably has a gage (6) of 0.5 to 2.5 mm, especially 1.0 to 2.3 mm.

In this regard, the inner and outer cover layers 2 and 3 preferably have a total gage (overall cover gage) of 1.0 to 5.5 mm, especially 1.5 to 5.3 mm.

Understandably, the inner and outer cover layers may be formed by well-known techniques such as injection molding and compression molding using half shells.

The multi-piece solid golf ball thus obtained should preferably have an inertia moment of at least 83 g-cm$^2$, especially 83 to 90 g-cm$^2$ as measured by the method described later. An inertia moment of less than 83 g-cm$^2$ would lead to the disadvantage that the ball rolling upon putting becomes unsustained.

The outer cover layer 3 is formed with dimples in a conventional manner. With respect to the diameter, weight and other parameters, the golf ball of the invention is constructed in accordance with the Rules of Golf to a diameter of not less than 42.67 mm and a weight of not greater than 45.93 grams.

There has been described a multi-piece solid golf ball featuring an increased flight distance, superior control, pleasant feeling, and improved durability.

EXAMPLE

Examples of the present invention are given below together with Comparative Examples by way of illustration and not by way of limitation.

Examples and Comparative Examples

Solid cores of the composition shown in Table 1 were prepared.

$$M = (/5880000) \times \{(r1-r2) \times D1^5 + (r2-r3) \times D2^5 + r3 \times D3^5\}$$

M: inertia moment (g-cm$^2$)
r1: core specific gravity
D1: core diameter
r2: inner cover layer specific gravity
D2: inner cover layer diameter (the diameter of a sphere obtained by forming the inner cover layer around the core)
r3: phantom outer cover layer specific gravity
D3: outer cover layer diameter (ball diameter)
Note that the diameters are expressed in mm.

Flight distance

Using a swing robot, the ball was hit with a driver (#W1, head speed 45 m/sec.) to measure a carry and total distance.

Spin rate

A spin rate was calculated from photographic analysis by photographing the behavior of the ball immediately after impact with #W1 and a sand wedge (#SW, head speed 20 m/sec.).

Feeling

Three professional golfers actually hit the ball with #W1 and a putter (#PT) to examine the ball for feeling according to the following criteria.

O: soft
: somewhat hard
X: hard

Scraping resistance

TABLE 1

| Solid core composition (pbw) | Example | | | | | Comparative Example | | | | | |
|---|---|---|---|---|---|---|---|---|---|---|---|
| | 1 | 2 | 3 | 4 | 5 | 1 | 2 | 3 | 4 | 5 | 6 |
| Polybutadiene* | 100 | 100 | 100 | 100 | 100 | 100 | 100 | 100 | 100 | 100 | 100 |
| Dicumyl peroxide | 1.2 | 1.2 | 1.2 | 1.2 | 1.2 | 1.2 | 1.2 | 1.2 | 1.2 | 1.2 | 1.2 |
| Barium sulfate | 12.5 | 7 | 15.5 | 8.5 | 7.8 | 0 | 19 | 21.2 | 12.9 | 20.7 | 10 |
| Zinc oxide | 5 | 5 | 5 | 5 | 5 | 3.8 | 5 | 5 | 5 | 5 | 5 |
| Antioxidant | 0.2 | 0.2 | 0.2 | 0.2 | 0.2 | 0.2 | 0.2 | 0.2 | 0.2 | 0.2 | 0.2 |
| Zinc salt of pentachlorothiophenol | 1 | 1 | 1 | 1 | 1 | 1 | 1 | 1 | 1 | 1 | 1 |
| Zinc acrylate | 29.6 | 25.9 | 23.7 | 29.6 | 25.9 | 39.2 | 33.3 | 25.9 | 34 | 34 | 31.8 |

*Polybutadiene: BR01 by Nippon Synthetic Rubber K.K.

Next, the cores each were enclosed with an inner cover layer of the composition shown in Table 2 by injection molding and then with an outer cover layer of the composition shown in Table 3 by injection molding, obtaining three-piece golf balls having a weight and diameter as shown in Tables 4 and 5.

The golf balls were examined for inertia moment, flight distance, spin rate, feeling, scraping resistance, and consecutive durability by the following tests. The results are shown in Tables 4 and 5.

Inertia moment

It is calculated according to the equation shown below. More particularly, the inertia moment is a value calculated from the diameters (gages) and specific gravities of the respective layers and it can be determined from the following equation on the assumption that the ball is spherical. Although the ball is regarded spherical for the calculation purpose, the specific gravity of the outer cover layer is lower than the specific gravity of the outer cover-forming resin itself because the dimples are present on the actual ball. The specific gravity of the outer cover layer is herein designated a phantom outer cover layer specific gravity, which is used for the calculation of an inertia moment M.

Using the swing robot, the ball was hit at arbitrary two points with a sand wedge (#SW, head speed 38 m/sec.). The ball at the hit points was visually examined.

O: good
: medium
X: poor

Consecutive durability

Using a flywheel hitting machine, the ball was repeatedly hit at a head speed of 38 m/sec. The ball was evaluated in terms of the number of hits repeated until the ball was broken.

O: good
X: poor

TABLE 2

| Inner cover layer (pbw) | Shore D | Specific gravity | a | b | c | d | e | f | g | h |
|---|---|---|---|---|---|---|---|---|---|---|
| HPR AR201 | about 5 | 0.96 | — | — | 20 | 40 | — | — | — | — |
| Dynalon 6100P | 35 | 0.88 | 48 | 30 | — | — | — | — | — | — |
| Hytrel 4047 | 40 | 1.12 | — | — | — | — | 100 | — | — | — |
| PEBAX 3533 | 42 | 1.01 | — | — | — | — | — | 100 | — | — |
| Surlyn AD8511 | 63 | 0.94 | 26 | 35 | 40 | 30 | — | — | — | — |
| Surlyn AD8512 | 63 | 0.94 | 26 | 35 | 40 | 30 | — | — | — | — |
| Himilan 1605 | 61 | 0.94 | — | — | — | — | — | — | — | 50 |
| Himilan 1706 | 60 | 0.94 | — | — | — | — | — | — | 60 | 50 |
| Surlyn 8120 | 45 | 0.94 | — | — | — | — | — | — | 40 | — |
| Titanium dioxide | — | 4.2 | 5.1 | 25 | 5.1 | 5.1 | 0 | 0 | 5.1 | 5.1 |

HPR AR201: Mitsui duPont Polychemicals K.K., acid-modified thermo-plastic resin

Dynalon: Nippon Synthetic Rubber K.K., block copolymer, hydrogenated butadiene-styrene copolymer Hytrel: Toray duPont K.K., thermoplastic polyester elastomer PEBAX: Atochem, polyamide elastomer Surlyn: E. I. dupont, ionomer resin Himilan: Mitsui duPont Polychemicals K.K., ionomer resin

TABLE 3

| Outer cover layer (pbw) | Shore D | Specific gravity | A | B | C | D | E | F | G |
|---|---|---|---|---|---|---|---|---|---|
| PANDEX T7890 | 39 | 1.16 | — | 100 | 80 | — | — | — | — |
| PANDEX T7298 | 50 | 1.16 | 100 | — | — | — | — | — | — |
| Himilan 1605 | 61 | 0.94 | — | — | 10 | — | 50 | — | — |
| Himilan 1706 | 60 | 0.94 | — | — | 10 | — | 50 | 40 | 70 |
| Surlyn 8120 | 45 | 0.94 | — | — | — | 100 | — | 60 | 30 |
| Titanium dioxide | — | 4.2 | 2.7 | 2.7 | 25 | 5.13 | 5.13 | 5.13 | 5.13 |

PANDEX: Dai-Nihon Ink Chemical Industry K.K., thermoplastic polyurethane elastomer
Himilan: Mitsui dupont Polychemicals K.K., ionomer resin
Surlyn: E. I. duPont, ionomer resin

TABLE 4

| | | Example | | | | |
|---|---|---|---|---|---|---|
| | | 1 | 2 | 3 | 4 | 5 |
| Solid core | Weight (g) | 29.63 | 28.11 | 27.76 | 28.36 | 28.46 |
| | Diameter (mm) | 36.60 | 36.40 | 35.80 | 36.30 | 36.50 |
| | Distortion @ 100 kg (mm) | 3.50 | 4.00 | 4.30 | 3.50 | 4.00 |
| | Specific gravity | 1.154 | 1.113 | 1.156 | 1.132 | 1.118 |
| Inner cover layer | Type | a | b | c | d | a |
| | Shore D hardness | 51 | 56 | 53 | 41 | 51 |
| | Specific gravity | 0.95 | 1.09 | 0.98 | 0.98 | 0.95 |
| | Gage (mm) | 1.60 | 1.70 | 2.00 | 1.20 | 1.60 |
| Outer cover layer | Type | A | A | B | A | C |
| | Specific gravity | 1.183 | 1.183 | 1.183 | 1.183 | 1.299 |
| | Gage (mm) | 1.45 | 1.45 | 1.45 | 2.00 | 1.50 |
| | Shore D hardness | 50 | 50 | 39 | 50 | 44 |
| Ball | Weight (g) | 45.30 | 45.30 | 45.30 | 45.30 | 45.30 |
| | Diameter (mm) | 42.70 | 42.70 | 42.70 | 42.70 | 42.70 |
| Inertia moment (g-cm$^2$) | | 83.1 | 84.3 | 83.1 | 83.8 | 84.5 |
| #W1/HS45 | Carry (m) | 209.0 | 208.6 | 208.6 | 208.8 | 208.6 |
| | Total (m) | 223.8 | 223.9 | 222.9 | 223.2 | 222.8 |
| | Spin (rpm) | 2771 | 2668 | 2846 | 2851 | 2802 |
| | Feeling | ◯ | ◯ | ◯ | ◯ | ◯ |
| #SW/HS20 approach spin (rpm) | | 6188 | 6125 | 6318 | 6215 | 6281 |
| #PT feeling | | ◯ | ◯ | ◯ | ◯ | ◯ |
| Scraping resistance | | ◯ | ◯ | ◯ | ◯ | ◯ |
| Consecutive durability | | ◯ | ◯ | ◯ | ◯ | ◯ |

TABLE 5

| | | Comparative Example | | | | | |
|---|---|---|---|---|---|---|---|
| | | 1 | 2 | 3 | 4 | 5 | 6 |
| Solid core | Weight (g) | 25.83 | 30.25 | 27.47 | 29.72 | 30.76 | 29.16 |
| | Diameter (mm) | 35.50 | 36.40 | 35.30 | 36.50 | 36.50 | 36.50 |
| | Distortion @ 100 kg (mm) | 2.20 | 3.00 | 4.00 | 2.90 | 2.90 | 3.20 |
| | Specific gravity | 1.103 | 1.198 | 1.193 | 1.167 | 1.208 | 1.145 |
| Inner cover layer | Type | e | f | e | e | g | h |
| | Shore D hardness | 40 | 42 | 40 | 40 | 56 | 62 |
| | Specific gravity | 1.12 | 1.01 | 1.12 | 1.12 | 0.98 | 0.98 |
| | Gage (mm) | 11.63 | 1.80 | 1.70 | 1.60 | 1.60 | 1.60 |
| Outer cover layer | Type | A | D | E | F | G | A |
| | Specific gravity | 1.183 | 0.980 | 0.980 | 0.980 | 0.980 | 1.183 |
| | Gage (mm) | 1.98 | 1.35 | 2.00 | 1.50 | 1.50 | 1.50 |
| | Shore D hardness | 50 | 45 | 62 | 53 | 58 | 50 |
| Ball | Weight (g) | 45.30 | 45.30 | 45.30 | 45.30 | 45.30 | 45.30 |
| | Diameter (mm) | 42.70 | 42.70 | 42.70 | 42.70 | 42.70 | 42.70 |
| Inertia moment (g-cm$^2$) | | 84.6 | 81.2 | 81.3 | 82.1 | 80.9 | 83.4 |
| #W1/HS45 | Carry (m) | 208.1 | 205.3 | 207.9 | 205.8 | 207.9 | 208.1 |
| | Total (m) | 217.2 | 217.5 | 221.0 | 218.1 | 219.2 | 220.3 |
| | Spin (rpm) | 3075 | 3001 | 2548 | 2898 | 2689 | 2734 |
| | Feeling | X | | ○ | | ○ | ○ |
| #SW/HS20 approach spin (rpm) | | 6251 | 6236 | 4923 | 6211 | 5632 | 6132 |
| #PT feeling | | ○ | ○ | X | ○ | X | X |
| Scraping resistance | | ○ | | ○ | | | X |
| Consecutive durability | | ○ | ○ | X | ○ | ○ | X |

What is claimed:

1. A multi-piece solid golf ball comprising: a solid core and a cover consisting of inner and outer layers surrounding the core, characterized in that said solid core has a distortion of at least 2.4 mm under an applied load of 100 kg, said inner cover layer consisting essentially of an ionomer resin to a Shore D hardness of 28 to 58, and said outer cover layer consisting essentially of a thermoplastic polyurethane elastomer to a Shore D hardness of 30 to 55.

2. The golf ball of claim 1 wherein the resin of said inner cover layer is a mixture of an ionomer resin and an olefinic elastomer in a weight ratio between 40:60 and 95:5.

3. The golf ball of claim 1 wherein in said outer cover layer, an ionomer resin having a Shore D hardness of at least 55 is mixed in a proportion of less than 70 parts by weight per 100 parts by weight of the thermoplastic polyurethane elastomer.

4. The golf ball of claim 1 wherein the ball as a whole has an inertia moment of at least 83 g-cm$^2$.

5. The golf ball of claim 1 wherein 1 to 30% by weight of an inorganic filler is added to said outer cover layer.

6. The golf ball of claim 1 wherein 1 to 30% by weight of an inorganic filler is added to said inner cover layer.

7. The golf ball of claim 1 wherein said outer cover layer has a specific gravity of 1.05 to 1.4.

8. The golf ball of claim 1 wherein said inner cover layer has a specific gravity of 0.8 to 1.2.

9. The golf ball of claim 1 wherein said core has a specific gravity of 0.9 to 1.3.

10. The golf ball of claim 1 wherein said outer cover layer has a gage of 0.5 to 2.5 mm, said inner cover layer has a gage of 0.5 to 3.0 mm, and said cover has a total gage of 1.0 to 5.5 mm.

11. The golf ball of claim 1 wherein said inner cover layer has a Shore D hardness in the range 30 to 57.

12. The golf ball of claim 1 wherein said outer cover layer has a Shore D hardness in the range 33 to 53.

13. The golf ball of claim 1 wherein said outer cover layer consists essentially of a thermoplastic polyurethane elastomer containing less than 30% by weight of an inorganic filler.

14. The golf ball of claim 1 wherein said inner cover layer consists essentially of an ionomer resin containing less than 30% by weight of an inorganic filler.

15. The golf ball of claim 1, wherein said core has a distortion of 2.7 to 7.0 mm under an applied load of 100 kg.

16. The golf ball of claim 1, wherein said inner core has a distortion of 2.9 to 5.5 mm under an applied load of 100 kg.

17. The golf ball of claim 1, wherein said cover layer is a mixture of an ionomer resin and an olefinic elastomer in a weight ratio between 55:45 and 85:15.

* * * * *